US007099593B1

(12) United States Patent
Islam et al.

(10) Patent No.: US 7,099,593 B1
(45) Date of Patent: Aug. 29, 2006

(54) SELF-SYNCHRONIZATION OF AN OPTICAL PACKET NETWORK USING SEED PULSES EXTRACTED FROM WITHIN THE PACKETS

(75) Inventors: Mohammed N. Islam, Allen, TX (US); Tiejun J. Xia, Richardson, TX (US)

(73) Assignee: University of Michigan, Ann Arbor, MI (US)

( * ) Notice: Subject to any disclaimer, the term of this patent is extended or adjusted under 35 U.S.C. 154(b) by 0 days.

(21) Appl. No.: 09/646,859

(22) PCT Filed: Feb. 17, 1999

(86) PCT No.: PCT/US99/03367

§ 371 (c)(1),
(2), (4) Date: Oct. 1, 2001

(87) PCT Pub. No.: WO99/41870

PCT Pub. Date: Aug. 19, 1999

Related U.S. Application Data

(60) Provisional application No. 60/075,013, filed on Feb. 17, 1998.

(51) Int. Cl.
*H04B 10/00* (2006.01)

(52) U.S. Cl. .................. 398/154; 398/155; 398/98; 398/101; 398/102; 398/157; 398/160; 398/201; 398/202; 385/122; 385/123; 370/355

(58) Field of Classification Search ............... 398/54, 398/98, 101–102, 154–155, 157, 160, 201, 398/202; 385/122–123; 370/355
See application file for complete search history.

(56) References Cited

U.S. PATENT DOCUMENTS

| 5,831,752 A | * | 11/1998 | Cotter et al. | 398/54 |
| 6,603,910 B1 | * | 8/2003 | Islam et al. | 385/123 |
| 2004/0081462 A1 | * | 4/2004 | Sarah | 398/42 |

* cited by examiner

*Primary Examiner*—Hanh Phan
(74) *Attorney, Agent, or Firm*—Gregory V. Bean

(57) ABSTRACT

A method and system for self-synchronizing an optical packet network by selecting a seed pulse from among the data pulses within a packet having no synchronization marker, transforming the seed pulse to be optically distinguishable from the remaining data pulses after the packet has been transmitted, and extracting that seed pulse for use in synchronizing the operation of the network. In one embodiment, the process is practiced using a intensity modifier (such as a fast-saturation, slow-recovery amplifier) to modify the seed pulse intensity, and an intensity discriminator (such as an unbalanced NOLM, or a dispersion-shifted fiber and bandpass filter) to extract the differentiated seed pulse.

20 Claims, 4 Drawing Sheets

US 7,099,593 B1

SELF-SYNCHRONIZATION OF AN OPTICAL PACKET NETWORK USING SEED PULSES EXTRACTED FROM WITHIN THE PACKETS

CROSS-REFERENCE TO RELATED APPLICATIONS

This application claims the benefit of priority under 35 U.S.C. § 120 from the provisional U.S. Patent Application Ser. No. 60/075,013 filed on Feb. 17, 1998, the content of which is relied upon and incorporated herein by reference in its entirety.

This invention was made with government support under DARPA contract number F-30602-97-1-2020.

BACKGROUND OF THE INVENTION

1. Field of the Invention

The present invention relates generally to synchronization schemes for high-speed packet time-division multiplexed (TDM) optical networks, and particularly to self-synchronization utilizing a data pulse contained within the packet.

2. Technical Background

Information may be transmitted electronically or optically between two locations as a constant stream of data pulses, or as discrete packets of data pulses. The discrete packets may have a variety of sizes or bit depths, depending upon the type of information being transmitted, the nature of the transmission pathway, and the characteristics or operating parameters of the network system.

In a packet network, some form of time-division multiplexing (TDM) is usually utilized to route packets to different locations or "nodes" throughout the transmission pathway, ensuring they arrive intact at their intended destination and may be reconstituted with other packets containing related information. As the packets traverse sequentially through various components of the network, timing functions dictate operations that are performed by those components to direct the packets to specific destinations, or signal management functions which are performed on the packets themselves. The packets may have fixed lengths bounded by "framing pulses" which occur periodically, or the packet size may be variable. The packets may include "headers" which contain information such as the packet's size, type, destination, and how it is to be accessed or recombined with related packets.

In a switch-based packet network, the routing nodes perform three basic functions: synchronizing one or more incoming and outgoing streams of packets, recognizing the headers, and storing packets in a buffer so they can be forwarded to outgoing pathways when there are openings available among the transmitted streams of packets. At each node, in addition to routing various packets to connected transmission pathways, some packets may be "dropped" from a faster-speed (higher-bandwidth) transmission pathway into a slower-speed (lower-bandwidth) pathway such as a local area network (LAN), and others "added" from the LAN into available spaces between packets on the faster-speed transmission pathway.

Some form of time synchronization is therefore needed to isolate adjacent packets from one another, merge or separate intersecting streams of packets, coordinate the operation of components with the packets that are passing through those components, and monitor the location of packets within the buffers while they await subsequent transmission.

One synchronization scheme employs fixed-rate clocks which generate uniform timing signals. Data packets are generated, transmitted, routed, and various signal management operations performed in synchronicity with these clock signals. While this feedback-type synchronization scheme has proven suitable for many conventional electronic data transmission networks, it cannot adequately accommodate timing jitters between transmitted optical packets and becomes problematical in high-speed switch-based optical networks.

An alternate approach is "self-synchronization," in which a marker pulse having a distinguishable characteristic is appended to or embedded within a specified packet (or every packet), and used to coordinate the operation of a component with that packet. As an example, the marker pulse is added to and transmitted with the original data in the packet, and the marker pulse is then duplicated or stripped off as the packet approaches a component and serves as the basis for the component's initiating and operation or timing the routing of the packet as it traverses through the component. Depending upon the configuration of the network, a marker pulse could be appended to every packet, or only to the lead packet among a group of packets having similar routing instructions. In this sense, the function of the marker pulses is somewhat analogous to headers attached to data files in the electronic domain since they are used to assist the routing or handling of the packets, but in addition they also regulate the timing of operations performed by various components encountered by the packets along the transmission pathway.

As an example, a marker pulse might be attached to a packet being transmitted over a high-speed telecommunications pathway. As that packet approaches a routing node, the marker (and possibly the entire packet depending upon the operation and complexity of the component at that node) is duplicated or stripped off along a parallel path. The packet traverses through a portion of the component which introduces a slight time delay equal to that required for the component to determine and execute the appropriate routing function, and the performance of that routing function is then performed on the packet according to the temporal synchronization between the packet and the stripped-off marker (each traversing separate but coordinated paths within the component).

In the optical domain, self-synchronization presents a variety of challenges. It is not currently practical to provide optical processors capable of interpreting the content of headers carrying routing instructions for the optical signal packets. Conversion to the electronic domain would defeat the advantage of using a high-speed optical network. Consequently, generating and discriminating markers must rely to some extent on modifying the characteristics of the optical signal or pulses from which the marker is composed compared with those of the packet.

A variety of self-synchronization schemes have been advanced for optical networks. One approach is to employ marker pulses having a different wavelength from the data packet which can be extracted by a wavelength filter. Of course, in networks which also transmit data simultaneously using multiple wavelengths or wavelength-division multiplexing (WDM) technology, the additional wavelengths needed for TDM synchronization consume some of the wavelengths available for WDM transmission, or affect WDM operation by narrowing the spacing between available wavelength channels. A similar approach is to use a marker pulse having a different polarization than the signal pulses in the packet, and recover the marker using a polarizer. Due to the varied nature of optical networks and fiber transmission systems, it is readily apparent that such a scheme introduces an undesired degree of complexity and imposes similar limitations on the performance of the system.

Another approach is to append the marker pulse a specified interval ahead of the packet (for example, a 1½ bit period), and extracting the marker using an AND-type logic gate with a corresponding 1½ bit period shift between its control and signal pulse trains. Generating packets in such a self-synchronization scheme becomes more complicated, and jitter between pulses may interfere with extracting the markers.

A further approach is to introduce a marker pulse which has an amplitude much greater than the remaining signal pulses within the packet—for example, on the order of five times greater amplitude—and distinguishing the marker using an optical asymmetric demultiplexer.

It will be readily appreciated by those skilled in the art that each of these optical self-synchronization approaches present certain common limitations. Packets transmitted over long distances with markers distinguished by unique wavelength, polarization, temporal, or intensity characteristics may be subject to disruption or interference from propagation-related effects such as dispersion, phase, or polarization shifts—as well as optical effects induced by other necessary intermediate components (amplifiers, filters, etc.) through which the packets are normally transmitted—and lose their capacity for accurate time synchronization. These optical self-synchronization schemes also rely on the packet containing a special and distinctive marker in addition to the normal data pulses, which inherently diminishes the efficiency of the network as measured by its information bandwidth or information transmission rate. Customized transmission and data-processing components must also be inserted at both the generating and receiving ends of a network to add and filter out the marker pulses from the packets, in order to preserve the integrity of the information content and to interface with conventional telecommunications or data-processing equipment.

As such, a need exists for a method and system for self-synchronization in a high-speed optical packet time-division multiplexed (TDM) network which does not require appending marker pulses to the packets in a manner detrimental to the transmission efficiency of the network, does not utilize a scheme for distinguishing the marker pulses from the packets which is susceptible to decay or disruption caused by propagation effects or intermediate components frequently encountered in existing transmission systems, does not unduly increase the complexity of the components required for signal generation and reception, nor threatens the integrity of the transmitted data.

SUMMARY OF THE INVENTION

The present invention provides a method for self-synchronizing an optical packet TDM network in which no separate marker need be appended to the original data packet—but instead uses one of the packet's own data pulses as a "seed" pulse for synchronization—with the optical characteristics of that seed pulse remaining substantially the same as those of the remaining data pulses within the packet when the packet is propagating along the transmission pathway. Moreover, the present invention may be practiced using components inserted at nodes along the transmission pathway, rather than requiring unconventional equipment at the signal generating or receiving stations.

One aspect of the present invention is a self-synchronization method for an optical packet network transmitting a packet having data pulses comprising the steps of transforming a seed pulse selected from among the plurality of data pulses within the packet to be optically distinguishable from the remaining data pulses, and discriminating or extracting that seed pulse from the remaining data pulses within the packet to be used for synchronizing an operation of the network.

In another aspect the present invention is a self-synchronization method for an optical packet network transmitting a packet having a plurality of data pulses comprising the steps of generating the packet (excluding a synchronization marker which is optically distinctive from other data pulses), transmitting the packet, transforming a seed pulse selected from among the plurality of data pulses within the packet to be optically distinguishable from remaining data pulses by a contrast ratio, discriminating that seed pulse from those remaining data pulses within the packet such that it can be extracted from the packet, and synchronizing the operation of the network using the seed pulse.

In a further aspect of the present invention, the step of transforming the seed pulse to be optically distinctive from the remaining data pulses may be performed by an intensity modifier, and the step of discriminating the seed pulse from the remaining data pulses may be performed by an intensity discriminator.

In a particular aspect of the present invention the step of transforming the seed pulse to be optically distinctive from the remaining data pulses may be performed by a fast-saturation, slow recover amplifier, and in another particular aspect of the present invention the step of discriminating the seed pulse from the remaining data pulses may be performed by an unbalanced NOLM, or a wavelength-shifting optical fiber and bandpass filter).

In another aspect the present invention includes a system for self-synchronizing a packet having a plurality of data pulses transmitted via an optical packet network (without an optically distinctive synchronization marker) including a signal modifier capable of transforming a seed pulse selected from among the data pulses within the packet to be optically distinguishable from the remaining data pulses based upon a contrast ratio, and a discriminator capable of distinguishing the transformed seed pulse from the remaining data pulses based upon the contrast ratio.

In a further aspect of the present invention, the signal modifier may be an intensity modifier, and the discriminator may be an intensity discriminator.

In a particular aspect of the present invention the intensity modifier may be a fast-saturation, slow recover amplifier, and in another particular aspect of the present invention the intensity discriminator may be either an unbalanced NOLM or a wavelength-shifting optical fiber and bandpass filter).

Additional features and advantages of the invention will be set forth in the detailed description which follows, and in part will be readily apparent to those skilled in the art from that description or recognized by practicing the invention as described in the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

DETAILED DESCRIPTION OF THE PREFERRED EMBODIMENTS

Reference will now be made in detail to preferred embodiments of the present invention, examples of which are illustrated in the accompanying drawings. Wherever possible, the same reference numbers will be used throughout the drawings to refer to the same or like parts.

Figure 1:
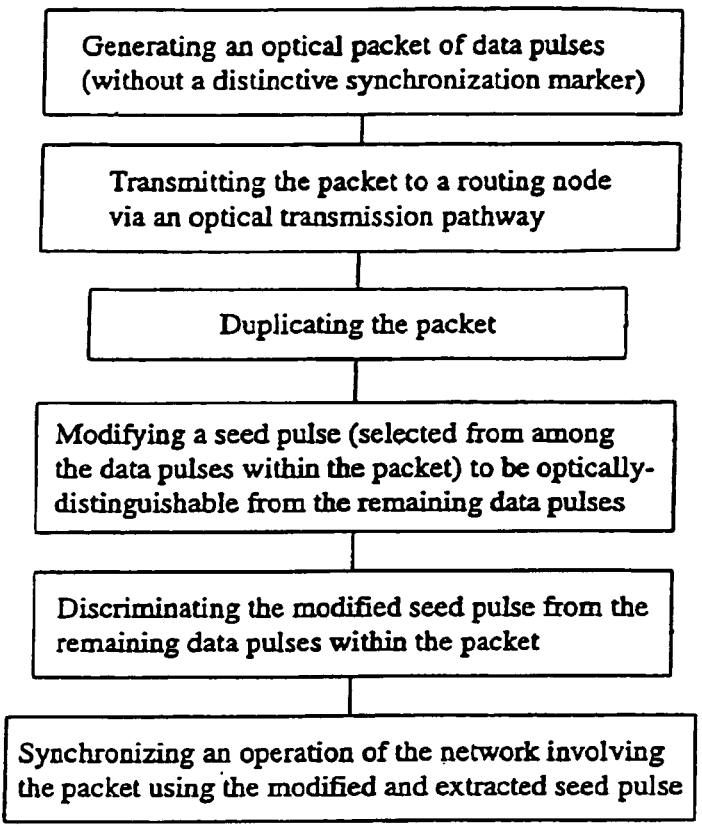
FIG. 1 is a flowchart showing the method of differentiating and extracting a seed pulse from within an optical packet for self-synchronization of an optical packet network of the present invention.

An exemplary embodiment of the method 10 of self-synchronizing an packet time-division multiplexed (TDM) optical network 12 of the present invention is shown in FIG. 1, and both the method and the associated system of this invention are designated generally throughout by that reference numeral 10.

In accordance with the invention, referring particularly to FIG. 1, the method 10 of the present invention is practiced by generating a packet 14 including a plurality of data pulses 16 which omits or excludes a distinctive timing or synchronization marker that is optically distinguishable from the data pulses 16 in the packet 14, transmitting the packet 14 to a generally remote routing node 18 or other component associated with the optical network 12, transforming a "seed pulse" 20 selected from among the data pulses 16 within the packet 14 to be optically distinguishable from the remaining data pulses 16 in the packet 14, discriminating that seed pulse 20 from those remaining data pulses 16 such that the seed pulse 20 can be extracted from the packet 14, and synchronizing a selected operation performed by or at the routing node 18 with the packet 14 using the extracted seed pulse 20.

The packet 14 will contain informational content encoded as a conventional digital signal in which data pulses 16 having generally uniform signal characteristics and predetermined periodicity are dispersed in varying patterns with intermediate null or blank spaces to produce a binary coding.

The packets 14 may have a fixed or variable length, and may include optional features such as headers for conveying address or other information.

As discussed herein, the packet 14 is composed of data pulses 16 which are substantially similar to one another from the perspective of conventional optical differentiation within an optical transmission network 12. That is, the packet 14 does not contain a specialized synchronization marker which is optically distinguishable from the data pulses 16, nor which is appended to or embedded within the packet 14 for the unique purpose of providing a timing or synchronization reference for that packet 14. The packet 14 is intended to be generated, encoded, and transmitted including only those data pulses 16 which convey informational content (including any header) or which are otherwise useful for non-synchronization-related functions, or ancillary synchronization functions that will not be performed using the seed pulse 20 produced and extracted from the packet 14 according to this invention. It may be readily appreciated that the packet 14 could still contain data pulses 16 which are optically distinguishable from one another (such as based upon wavelength, polarity, intensity, phase, or other optical characteristics), and used for purposes other than self-synchronization, or used for ancillary synchronization processes unrelated to those involving the seed pulse 20 of the present invention, such as by adjunct components or networks not employing the self-synchronization method 10 described herein.

As discussed further below, it will be readily apparent to those skilled in the art that the method 10 of this invention may be utilized with a wide variety of conventional or hereafter-developed packet 14 and data pulse 16 schemes, provided that certain limitations are observed involving the variability of pulse intensity among the data pulses 16, and the pulse-spacing between adjacent data pulses 16 or packets 14.

As embodied herein, and similarly depicted in FIG. 1, the method 10 as discussed may further optionally be practiced by duplicating the transmitted packet 14 as it approaches the node along an incoming transmission pathway 22, and splitting the original packet 14 and a duplicate packet so they propagate along parallel pathways. As discussed further below, those parallel pathways will be configured so that the position of the original packet 14 and the duplicate packet may be coordinated based upon the length of the corresponding pathway and the rate at which the original packet 14 or the duplicate packet traverses through the pathway and any component disposed therealong. For most purposes, the original packet 14 and the duplicate packet will be virtually indistinguishable from one another unless some modified characteristic is introduced into either the original packet 14 or the duplicate packet, and either the original packet 14 or the duplicate packet may be selected based upon the design of the network 12 for use as the source of the self-synchronization seed pulse 20 or the packet to be transmitted as data. In that regard, unless otherwise noted, the term packet may be utilized herein substantially interchangeably to mean either the original packet 14 or the duplicate packet.

Figure 2:
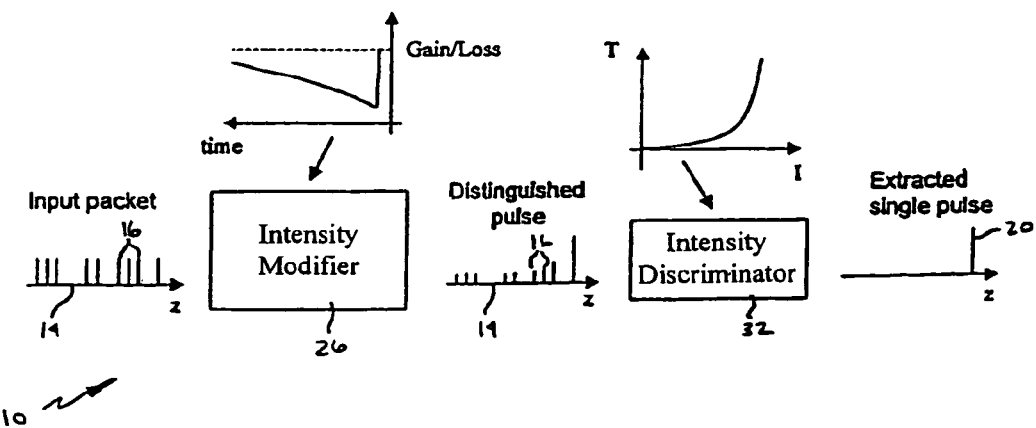
FIG. 2 is a diagram depicting one embodiment of the system for differentiating and extracting a seed pulse from within an optical packet for self-synchronization of an optical packet network of the present invention.

As embodied herein, and depicted in FIG. 2, one embodiment of the method 10 as discussed may be practiced by employing an amplitude or intensity modifier 26 to perform the step of transforming the seed pulse 20 to be optically distinguishable from the remaining data pulses 16 in the packet 14. The intensity modifier 26 is capable of differentially altering the intensity of at least one selected data pulse 16 compared with the remaining data pulses 16 to produce a detectable contrast ratio between the seed pulse 20 and the remaining data pulses 16. In such an embodiment, the most practical approach is for the seed pulse 20 to be the first data pulse 16 of the packet 14, as has been depicted in FIG. 2. It will be readily appreciated that the packet 14 shown in FIG. 2 has a null space following the first data pulse 16, however it may be readily appreciated that the first and subsequent data pulses 16 may also be directly adjacent one another.

Figure 3:
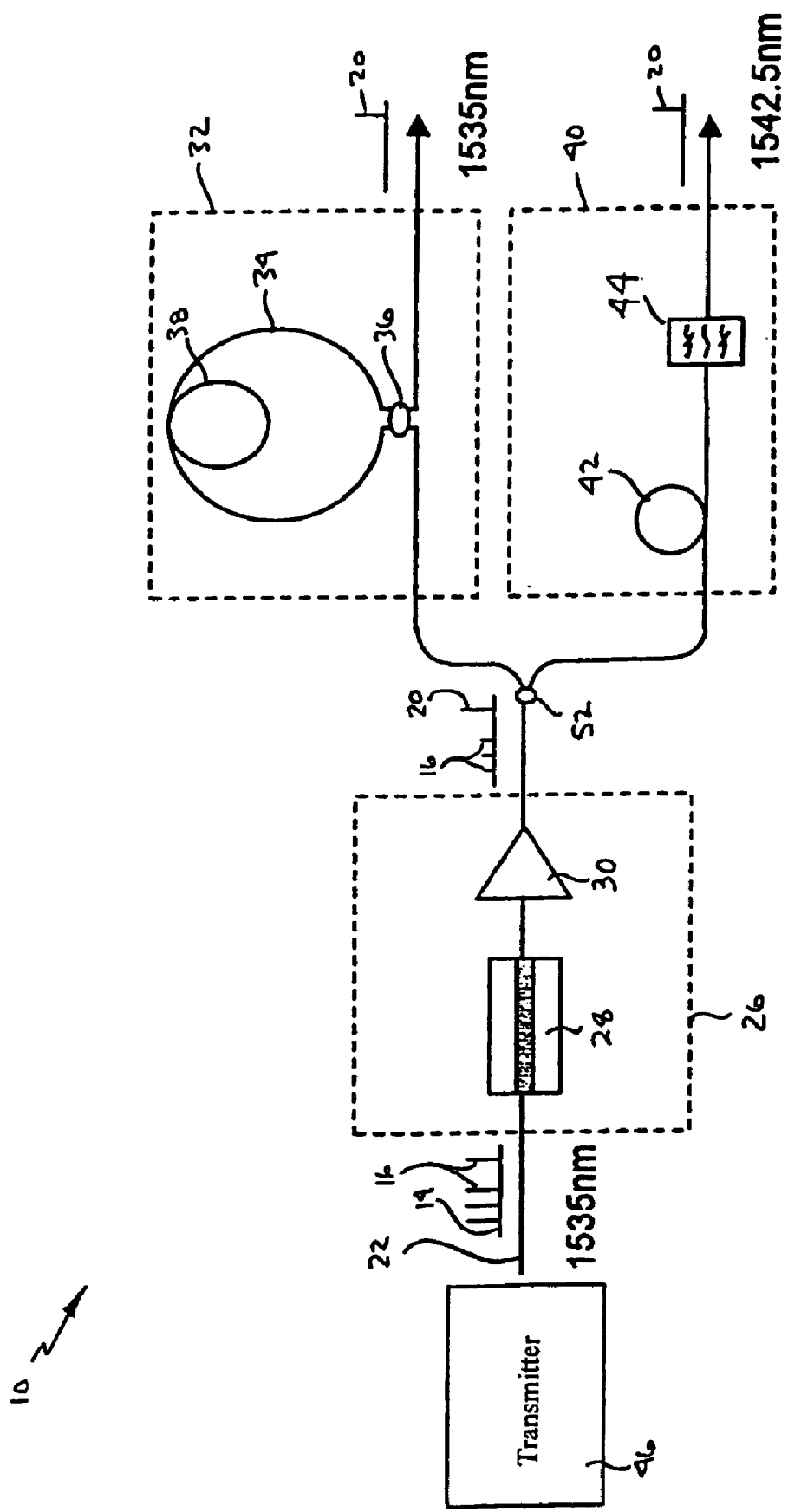
FIG. 3 is a schematic diagram of a further embodiment of the system of this invention utilizing an intensity modifier and an intensity discriminator, showing two alternate embodiments for the intensity discriminator.
Figure 5:
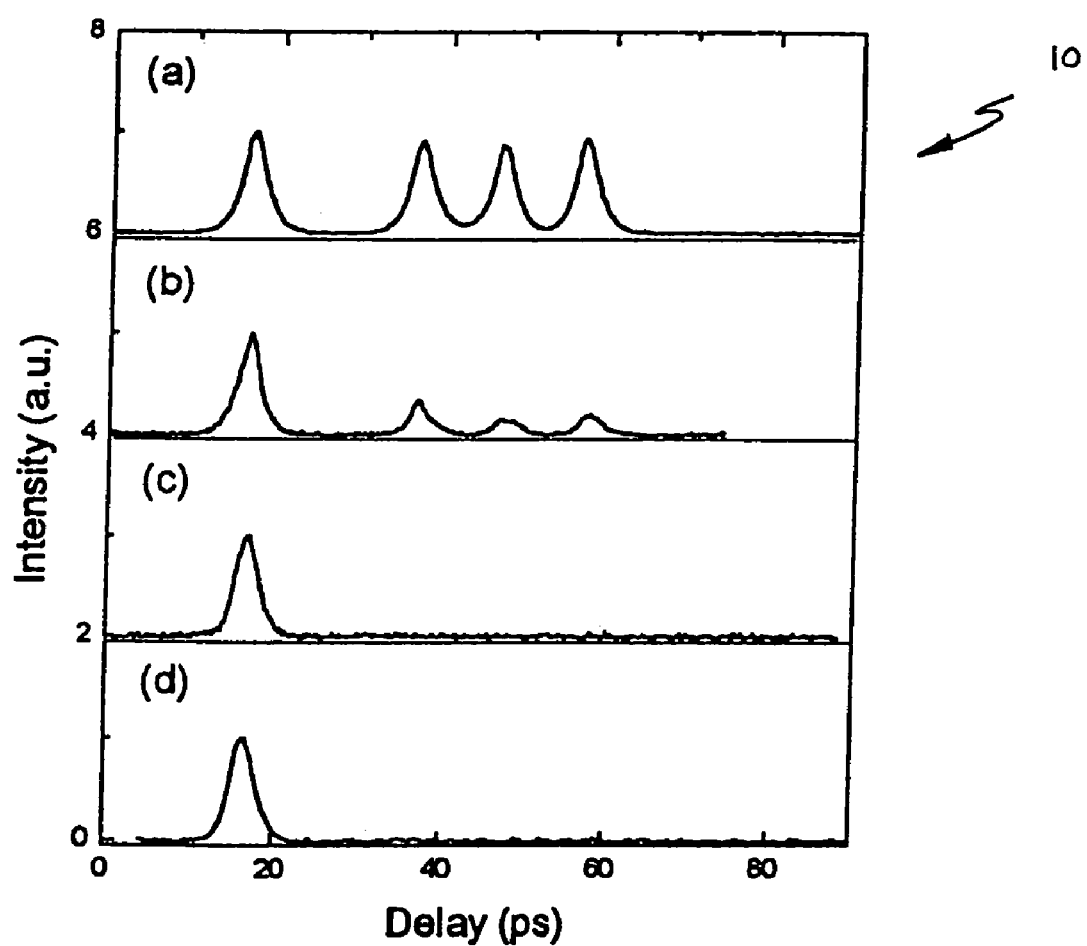
FIG. 5 is a diagram showing an input packet composed of a plurality of data pulses (a), the output of the intensity modifier in which a differentiable contrast ratio has been created between the first seed pulse and subsequent data pulses (b), and the output seed pulse as distinguished by a unbalanced NOLM intensity discriminator (c) and a SPM/filter intensity discriminator (d).

Referring particularly to FIG. 3, in practicing one embodiment of the method 10 as discussed, the intensity modifier 26 could be a fast-saturation, slow-recovery semiconductor optical amplifier (SOA) 28 which produces a contrast ratio between the first and second data pulses 16 on the order of 3 decibels (dB) or greater at the output of the SOA 28 in a 100 Gigabit/second (Gbit/s) eight-bit packet 14 (i.e., having eight data pulses 16). The SOA 28 exhibits a fast gain saturation when excited with short optical pulses, with saturation occurring during the width of one data pulse 16 for data pulses 16 of several picoseconds (ps). The SOA 28 exhibits a relatively long recovery time, which typically ranges from 0.2 to 1 nanosecond (ns), selected to ensure that for a given length packet 14 the SAO 28 does not recover prior to the last data pulse 16 passing to prevent excitation and the corresponding intensity transformation of subsequent data pulses 16 within the same packet 14. The SOA 28 therefore produces and transmits a packet 14 in which the first seed pulse 20 has an intensity greater than the remaining data pulses 16, with a sufficient contrast ratio between the intensities so that the seed pulse 20 can readily be optically distinguished from the remaining data pulses 16, and subsequently extracted from the packet 14. For example, referring to FIG. 5, curve (a) depicts the relatively uniform intensity levels for several data pulses 14 within a packet 14 input into an SOA 28 as described, in comparison with the differentiated intensity of the first seed pulse 20 relative to the remaining data pulses 16 in curve (b).

Alternately, the intensity modifier 26 may be a semiconductor laser amplifier (SLA) such as an InGaAsP SLA, or another component suitable as an intensity modifier 26. It may be appreciated that in the case where the intensity modifier 26 is an amplifier of the SOA or SLA type, the contrast ratio can be expressed as a positive value, a two-part ratio greater than one, or a fraction greater than one.

As embodied herein, referring particularly to FIG. 3, an optical amplifier 30 such as an erbium-doped fiber amplifier (EDFA) may be operatively connected to the intensity modifier 26 to compensate for any losses in intensity due to factors such as the insertion loss of the intensity modifier 26. in the case of the SOA 28, this insertion loss may be on the order of 6 dB.

As embodied herein, and again depicted in FIGS. 2 and 3, the embodiment of the method 10 as discussed in which an intensity modifier 26 is utilized to transform the seed pulse 20 so as to be distinguishable from the remaining data pulses 16 may be practiced using an intensity discriminator 32 to perform the operation of discriminating the seed pulse 20 from the remaining data pulses 16 when an intensity modifier 26 is utilized to transform the seed pulse 20, such that the seed pulse 20 can be readily differentiated or extracted from the packet 14 for use in synchronization.

Referring particularly to FIG. 3, one embodiment of the intensity discriminator 32 may be an unbalanced non-linear optical loop mirror (NOLM) 34, which includes a 3 dB directional coupler 36 having an uneven (30/70) beam splitting ratio operatively connected to the output of the intensity modifier 26, and a nonlinear element such as a 1.3 kilometer (km) length of dispersion-shifting (DS) optical fiber 38 connected to opposing sides of the directional coupler 36 such that clockwise and counter-clockwise traversing beams experience different nonlinear phase shifts. The phase shift difference is a function of the input intensity of the seed pulse 20 or data pulses 16, and the NOLM 34 can be adjusted to exhibit a significantly higher transmission for the high intensity seed pulse 20 than for the low intensity data pulses 16. In such an embodiment, the center or peak wavelength of the seed pulse 20 will remain relatively invariable compared with the peak or center wavelength of the original data pulse 16 prior to amplification by the intensity modifier 26, for example remaining relatively constant at 1535 nm.

Referring again to FIG. 3, another embodiment of the intensity discriminator 32 may be a self-phase modulation (SPM) optical filter intensity discriminator 40, which includes a 250 meter (m) length of DS optical fiber 42 operatively connected to the output of the intensity modifier 26, and a selected bandpass filter 44 connected to the dispersion shifted optical fiber 42. A dispersion-shifted optical fiber 42 having a zero-dispersion wavelength ($\lambda_o$) very close to the working wavelength is used to produce spectral broadening, with the width of the broadened spectrum having a nonlinear dependence on the input intensity. The filter 44 is selected to only transmit wavelengths displaced sufficiently from the working (input) wavelength so that the seed pulse 20 has sufficient intensity to be wavelength shifted to or above the cutoff or threshold window of the filter 44, whereas the remaining data pulses 16 have insufficient intensity to be shifted to that filter window and are absorbed, eliminated, or reflected by the filter 44. In such an embodiment, the center or peak wavelength of the seed pulse 20 will be shifted a predetermined degree to a new output wavelength, for example from 1535 nm input into the intensity modifier 26 to 1542.5 nm output from the intensity discriminator 32.

As described herein, the intensity discriminators 32 further produce a contrast ratio on the order of 20 dB or greater at their outputs. As such, the extracted seed pulse 20 will experience net gain when using an intensity modifier 26, EDFA 30, and intensity discriminator 32 as described herein (including insertion loss resulting from and amplification produced by the intensity modifier 26, and amplification from the EDFA 30) of approximately 6.5 dB using the unbalanced NOLM 34 intensity discriminator 32 and 3.5 dB using the DS fiber 42/filter 44 intensity discriminator 32.

Figure 4:
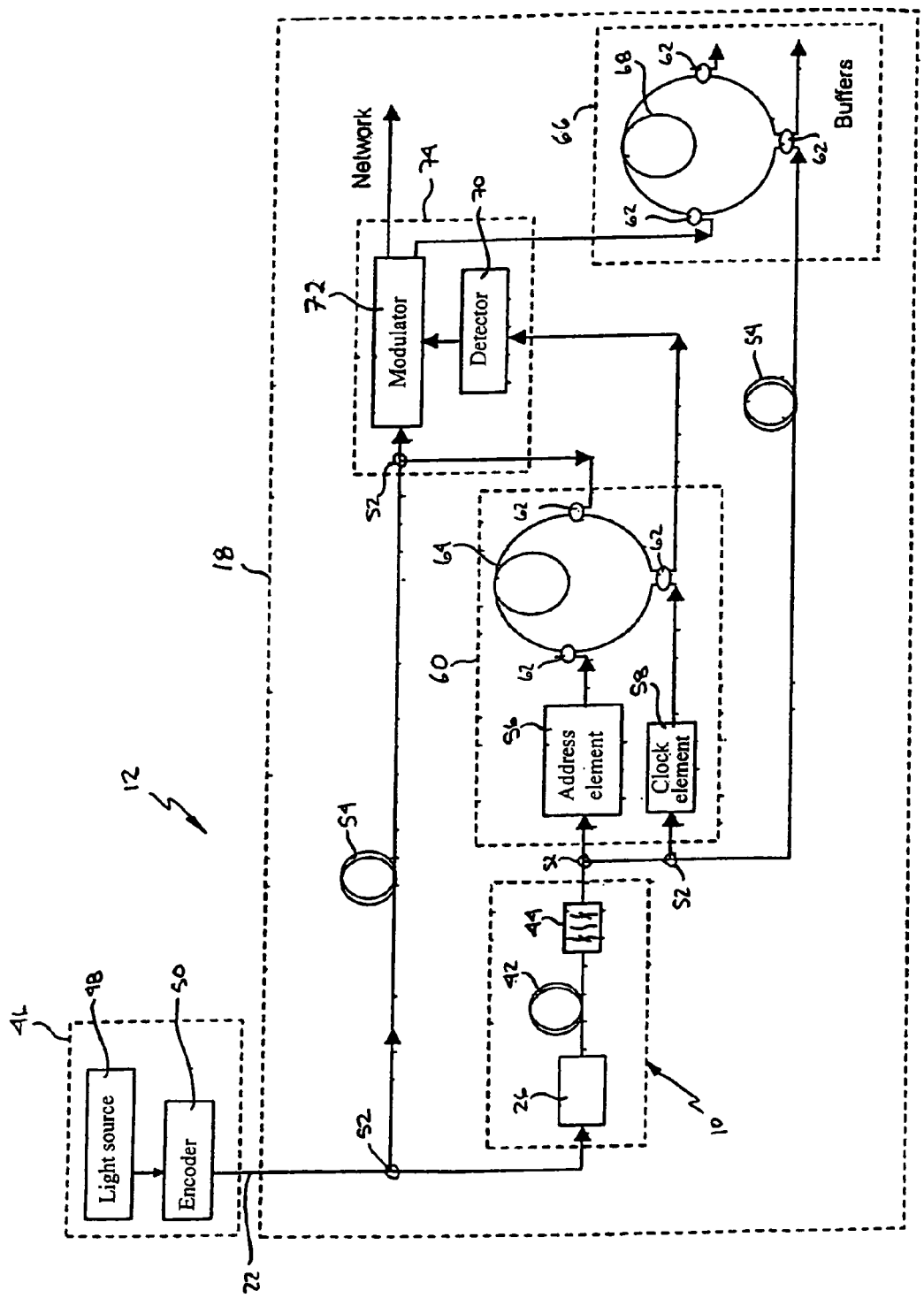
FIG. 4 is a schematic diagram of an optical packet network including a transmitter, transmission pathway, self-synchronization system, header processor, packet router, and demultiplexer.

In accordance with the invention, referring particularly to FIG. 4, the method 10 of the present invention may be practiced in association with an optical packet network 12 including a diversity of elements including a transmitter 46 consisting of a light source 48 such as a laser or light-emitting diode (LED), and an encoder or modulator 50 for converting the light emanating from the source 26 into packets 14 of data pulses 16 having a predetermined periodicity and pattern corresponding to informational content being transmitted. One suitable alternative for the source 48 is a passively mode-locked fiber laser (1535 nm, 1.5 ps), and a suitable alternative for the encoder 50 for purposes of generating packets 14 of periodic data pulses 16 is composed of suitably-configured couplers and fiber delay lines, although any conventional source 48 and modulator 50 may be utilized to generate packets 14 composed of data pulses 16 having the desired periodicity, spacing, and patterning.

The optical network further includes a transmission pathway 22 composed of such lengths of optical fiber as necessary to extend from the transmitter 46 to various nodes in the network 12, and which may include splitters or couplers 52 for duplicating the packet 14 incoming to a node into an original packet 14 and a duplicate packet 24.

As embodied herein, referring again to FIG. 4, a variety of optical elements may be utilized to perform the synchronization and routing operations on the packet 14.

Upon approaching the node, the packet 14 encounters a splitter or coupler 52 which duplicates the packet 14, either the original packet 14 or the duplicate packet being directed to a delay 54 for subsequent routing, transmission, or signal processing, and the other packet 14 being directed to the intensity modifier 26 and intensity discriminator 32 such that the extracted seed pulse 20 is output. The extracted seed pulse 20 is directed to first and second splitters or couplers 52 such that it is duplicated and transmitted to the local address element 56 and clock element 58 of a header processor 60, and subsequently to adjacent input couplers 62 of a Lo-Bi NOLM 64. A further duplicate of the seed pulse 20 is directed through a delay 54 to the input coupler 62 of a demultiplexer 66, which is similarly composed of a (2λ) NOLM 68. The output coupler 62 of the demultiplexer 66 is connected to a local buffer (not shown). The opposing input coupler of the Lo-Bi NOLM 64 in the header processor 60 is connected to receive a duplicate of the packet 14 transmitted through the first delay 54, and the output coupler 62 is connected to a detector 70 and subsequently to a (2×2) modulator 72 of a packet router 74, the outputs of which are in turn connected back to the transmission pathway 22 and to the input coupler 62 of the NOLM 68 in the demultiplxer 66.

Using an optical network 12 with the optical elements of a routing node configured as described, and such that the delays 54 are set to match the time required for the packet 14 or seed pulse 20 to traverse the various elements, a seed pulse 20 may be discriminated and extracted from the transmitted packet 14 and used to synchronize the operation of the header processor 60, packet router 74, demultiplexer 66, and any associated buffers. As such, the routing node of the optical network 12 can perform such functions as merging incoming or outgoing streams of packets 14, routing packets 14 to other interconnected transmission pathways 22, up- or down-shifting packets 14 to different networks 12 or pathways 22, coordinating and controlling signal management functions performed on the packets 14, storing and extracting the packets 14 from buffers, and performing other conventional functions and operations of a high-speed optical packet network 12 without appending distinctive synchronization markers to the packets 14 when they are generated or modulated prior to transmission.

In accordance with the invention, referring particularly to FIGS. 2 and 3, the present invention for a system 10 to self-synchronize the operation of an optical packet network 12 transmitting packets 14 each having a plurality of data pulses 16 but excluding a synchronization marker which is optically distinctive compared to the plurality of data pulses 16 when transmitted is described and shown.

As discussed in further detail above with reference to specific embodiments and components, the system includes a signal modifier 26 (such as a fast-saturation, slow-recovery intensity modifier capable of transforming the seed pulse 20 selected from among the plurality of data pulses 16 within the packet 14 so as to be optically distinguishable from remaining ones of the plurality of data pulses 16 based upon a contrast ratio), and a discriminator 32 capable of distinguishing the modified seed pulse 20 from the remaining data pulses 16 based upon that contrast ratio (such as an unbalanced NOLM 34 which includes a directional coupler 36 having an uneven beam splitting ratio, a self-phase modulation (SPM) optical filter intensity discriminator 40) as previously described.

It will be readily apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A self-synchronization method for an optical packet network transmitting a packet having a plurality of data pulses, said optical packet network having a node, said method comprising the steps of:

generating the packet including the plurality of data pulses, the packet excluding a synchronization marker which is optically distinctive from the plurality of data pulses;

transmitting the packet to the node;

transforming a seed pulse selected from among the plurality of data pulses within the packet to be optically distinguishable from remaining ones of the plurality of data pulses;

discriminating said seed pulse from said remaining ones of the plurality of data pulses within the packet; and synchronizing an operation of the optical packet network involving the packet at the node using the seed pulse.

2. The self-synchronization method of claim 1 wherein the step of generating the packet and the plurality of data pulses is performed by a laser source and a modulator.

3. The self-synchronization method of claim 1 wherein the network is a high-speed, optical packet time-division multiplexed (TDM) network and the operation is performed by a component selected from a group consisting of: a packet router, a header processor, a multiplexer, or a demultiplexer.

4. The self-synchronization method of claim 1 wherein prior to the step of transforming the seed pulse selected from among the plurality of data pulses within the packet the method further comprises the step of:

duplicating the packet to produce a replicate packet.

5. The self-synchronization method of claim 4 wherein the steps of transforming and discriminating the seed pulse are performed on the replicate packet.

6. The self-synchronization method of claim 1 wherein the plurality of data pulses each have an amplitude, and the step of transforming the seed pulse is performed using an amplitude modifier which alters said amplitude of the seed pulse sufficiently compared to said amplitude of the remaining ones of the plurality of data pulses to produce a contrast ratio between said amplitude of the seed pulse and said amplitude of the remaining ones of the plurality of data pulses such that the seed pulse is optically distinguishable from the remaining ones of the plurality of data pulses.

7. The self-synchronization method of claim 6 wherein the amplitude modifier is a fast-saturation, slow-recovery device.

8. The self-synchronization method of claim 7 wherein the amplitude modifier is a silicon optical amplifier.

9. The self-synchronization method of claim 7 wherein the packet has a first sequential data pulse and the seed pulse is said first sequential data pulse.

10. The self-synchronization method of claim 6 wherein the contrast ratio is on the order of 3 dB or greater.

11. The self-synchronization method of claim 1 wherein the step of discriminating the seed pulse from the remaining ones of the plurality of data pulses within the packet is performed by an unbalanced non-linear optical loop mirror (NOLM) intensity discriminator.

12. The self-synchronization method of claim 1 wherein the step of discriminating the seed pulse from the remaining ones of the plurality of data pulses within the packet is performed by a self-phase modulation (SPM) optical filter intensity discriminator.

13. A system for self-synchronizing a packet having a plurality of data pulses transmitted via an optical packet network, said packet excluding a synchronization marker which is optically distinctive compared to said plurality of data pulses when transmitted, said optical packet network including a routing node, said system comprising:
   a signal modifier operatively connected to the routing node receiving the packet via the optical packet network, the signal modifier being capable of transforming a seed pulse selected from among the plurality of data pulses within the packet so as to be optically distinguishable from remaining ones of the plurality of data pulses based upon a contrast ratio; and
   a discriminator capable of distinguishing said seed pulse from said remaining ones of the plurality of data pulses based upon said contrast ratio.

14. The system of claim 13 wherein the signal modifier is a fast-saturation, slow recover intensity modifier.

15. The system of claim 14 wherein the contrast ratio is on the order of 3 dB or greater.

16. The system of claim 13 wherein the signal modifier is an amplifier.

17. The system of claim 16 wherein the amplifier is a semiconductor optical amplifier.

18. The system of claim 13 wherein the discriminator is an unbalanced non-linear optical loop mirror (NOLM) intensity discriminator.

19. The system of claim 13 wherein the discriminator is a self-phase modulation (SPM) optical filter intensity discriminator.

20. A method for self-synchronizing a packet in an optical packet time-division multiplexed (TDM) network wherein the packet including a plurality of data pulses is generated and transmitted to a routing node without a synchronization marker that is optically distinctive from said plurality of data pulses, the method comprising:
   transforming a seed pulse selected from among the plurality of data pulses within the packet to be optically distinguishable from remaining ones of the plurality of data pulses proximate to the routing node;
   discriminating said seed pulse from said remaining ones of the plurality of data pulses within the packet; and
   synchronizing an operation of the optical packet network involving the packet at the node using the seed pulse.

* * * * *